United States Patent [19]

Kah, Jr.

[11] 4,316,480
[45] * Feb. 23, 1982

[54] SEQUENCING VALVE

[76] Inventor: Carl L. C. Kah, Jr., 778 Lakeside Dr., North Palm Beach, Fla. 33408

[*] Notice: The portion of the term of this patent subsequent to Nov. 14, 1995, has been disclaimed.

[21] Appl. No.: 955,950

[22] Filed: Oct. 30, 1978

[51] Int. Cl.$^3$ ............................................. F16K 21/00
[52] U.S. Cl. ................................. 137/119; 137/217; 137/624.13; 137/624.18; 251/367
[58] Field of Search ............... 285/360, 361, 376, 396, 285/401, 402; 251/367; 137/119, 217, 624.13, 624.18, 529

[56] References Cited

U.S. PATENT DOCUMENTS

| | | | |
|---|---|---|---|
| 2,968,311 | 1/1961 | Whitlock, Jr. | 137/624.13 |
| 3,017,897 | 1/1962 | Seguenot | 137/529 |
| 3,227,380 | 1/1966 | Pinkston | 285/376 |
| 3,369,565 | 2/1968 | Haggard, Jr. | 137/624.18 |
| 3,460,560 | 8/1969 | Kah, Jr. et al. | 137/119 |
| 3,524,470 | 8/1970 | Kah, Jr. et al. | 137/119 |
| 3,635,237 | 1/1972 | Kah, Jr. | 137/119 |
| 3,785,391 | 1/1974 | Miller | 137/119 |
| 3,924,652 | 12/1975 | Kah, Jr. | 137/119 |
| 4,109,670 | 8/1978 | Slagel | 137/624.18 |
| 4,125,124 | 11/1978 | Kah | 137/119 |

Primary Examiner—H. Jay Spiegel
Attorney, Agent, or Firm—Jack N. McCarthy

[57] ABSTRACT

A sequencing valve for distributing fluid from an inlet selectively to one or more of a plurality of outlets. The sequencing valve includes an inlet section, an intermediate section, and an outlet section; a piston valve arrangement controls flow from said inlet section to said intermediate section and a valving member directs flow from said intermediate section into a selected outlet or outlets of said outlet section; said outlet section including a biasing means for biasing said piston arrangement to a closed position; movement of said piston valve arrangement providing for sequencing of said valving member. Said biasing means (a) can provide a fixed biasing force on said piston arrangement; (b) can provide a positive closing force on said piston arrangement to prevent flow therethrough; or (c) can provide a negative force to reduce any closing force on said piston arrangement to zero. Said sequencing valve has a quick connect-disconnect type mechanism for providing easy access for inspection or repair.

14 Claims, 6 Drawing Figures

SEQUENCING VALVE

BACKGROUND OF THE INVENTION

This invention relates to sequencing valves and more particularly to sequencing valves which selectively direct a source of fluid to one or more of a plurality of outlets. Sequencing valves which utilize fluid pressure variation to switch the valve discharge port being supplied have found great acceptance. Examples of the prior art in this category, which my invention described hereinafter constitutes an improvement over, are U.S. Pat. Nos. 3,369,565; 3,785,391; 3,924,652; 4,034,775; and 4,125,124.

SUMMARY OF THE INVENTION

In accordance with the present invention, a piston valve arrangement is located between an inlet section and a valving member and is operatively connected to said valving member to sequence an opening in the valving member into register with selected outlet ports in an outlet section. The sequencing is determined by a camming device connected between said piston valve arrangement in said valve housing with the sequence being in response to down-and-up movement of said piston valve arrangement. A seating surface is provided for the piston valve arrangement so that it can also serve as a reverse flow check valve or shut-off valve; said piston valve arrangement having a biasing means for returning it to its up position with said biasing means including a cylindrical bore located in said housing, axially aligned with said piston valve arrangement, and having a piston mounted therein with a rod at the center thereof contacting the piston valve arrangement; a spring being located between the piston and the bottom of the bore so that it always applies an upward force to the piston valve arrangement.

It is an object of this invention to provide a sequencing valve in which the piston valve arrangement can be positively held in a closed position which will provide protection for potable water supplies.

It is another object of this invention to provide a sequencing valve having means for positively removing a closing force on the piston valve arrangement. This will permit an inlet pressure to easily index and open the piston valve arrangement since the returning cycling and closing force has been removed.

It is a further object of this invention to provide a sequencing valve having a fluid supply connected to the inlet section for opening said piston valve arrangement; and with said same fluid supply connected to a biasing means for closing said piston valve arrangement, said biasing means having a piston with a larger effective area so that the resultant force is in a closing direction; means are provided to cut off the fluid supply to said biasing means and connect it to dump, permitting said piston valve arrangement to open.

It is another object of this invention to provide a sequencing valve having the outlet of a pump connected to the inlet section for opening said piston valve arrangement, and the inlet of the pump connected to a biasing means for removing the closing force of said biasing means on the piston valve arrangement. When said pump is started, the fluid pressure at the outlet of the pump is permitted to open said piston valve arrangement, while the connection to the inlet of the pump provides a suction pulling against the closing force of said biasing means to provide an easier and more positive opening movement. Also the valve is maintained in a cycled position during instances of pump output flow surges that might occur during pump self-priming.

DESCRIPTION OF THE PREFERRED EMBODIMENT

Figure 1:
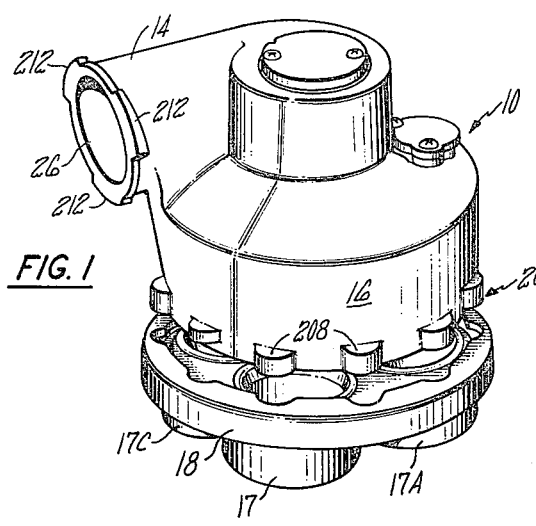
FIG. 1 is a perspective showing of the sequencing valve.

FIG. 1 shows a sequencing valve 10 which can be used in a watering system in the same manner as the sequencing valve shown in U.S. application Ser. No. 710,792 now U.S. Pat. No. 4,125,124. The sequencing valve 10 includes a housing 12 which includes an inlet section 14, an intermediate section 16, and an outlet section 18. The intermediate section 16 comprises a first chamber 20 and a second chamber 22 which is cylindrical and open at one end, said first and second chambers being connected by a cylindrical opening 24 which is coaxial with said cylindrical chamber 22; said inlet section 14 has an inlet 26 at one end and an opening 28 at the other end connecting it to the first chamber 20 of the intermediate section 16.

The outlet section 18 is connected to the bottom of the intermediate section 16 at the open end of cylindrical second chamber 22 by a quick connect-disconnect mechanism 200 which will be hereinafter described. Outlet section 18 has a plurality of outlets 17, 17A, 17B and 17C for connection to a plurality of system lines.

An anti-siphon mechanism 30 is located on the intermediate section 16 and comprises a movable valve section 32 which has a cylindrical valve seat 34 biased upwardly through an opening 41 against a seal ring 36 by a spring 38. Spring 38 is guided on a rod 40 which projects upwardly from a flange 42 on the inner surface of the cylindrical chamber 22 of intermediate section 16. The seal ring 36 is held in position in an enlarged countersunk opening 43 around the edge of said opening 41 by a cover 46 which is fixed to the intermediate housing by any means desired, such as by screws. The cover 46 prevents dirt from clogging the anti-siphon mechanism 30, permitting air to be drawn into chamber 22 whenever a suction occurs therein.

A distributing valving member 50 is coaxially mounted in chamber 22. Valving chamber 50 includes at least one port 52 which may be selectively indexed, as described hereinafter, to come into register with one of the outlet ports, two of which are shown at 54 and 56, of outlets 17 and 17B, respectively. While these are two outlets of a sequencing valve 10 having an outlet section 18 with four outlets, other valves having other numbers of outlets can be used. The valving member 50 is connected by a rod 60 to a piston valve arrangement 62.

The piston valve arrangement 62 comprises a circular flange 64 which is coaxially mounted with cylindrical opening 24 and is arranged to overlap a flat annular surface 66 located around said cylindrical opening 24 on the side which engages cylindrical chamber 22. The circular flange 64 has an annular valve sealing member 68 positioned around its outer surface for engaging the flat annular surface 66 when the piston arrangement 62 is biased upwardly.

The piston arrangement 62 includes a rod extension 60A which extends upwardly above said flange 64 and in line with rod 60. This rod has longitudinally spaced cam followers 74 and 76 which engage cam mechanisms 78 which are mounted around the inner surface of an indexing cylinder 80 which extends through an opening in the top of intermediate section 16 and is fixed to the top of the housing by an integral flange 82 and bolts 84.

Figure 2:
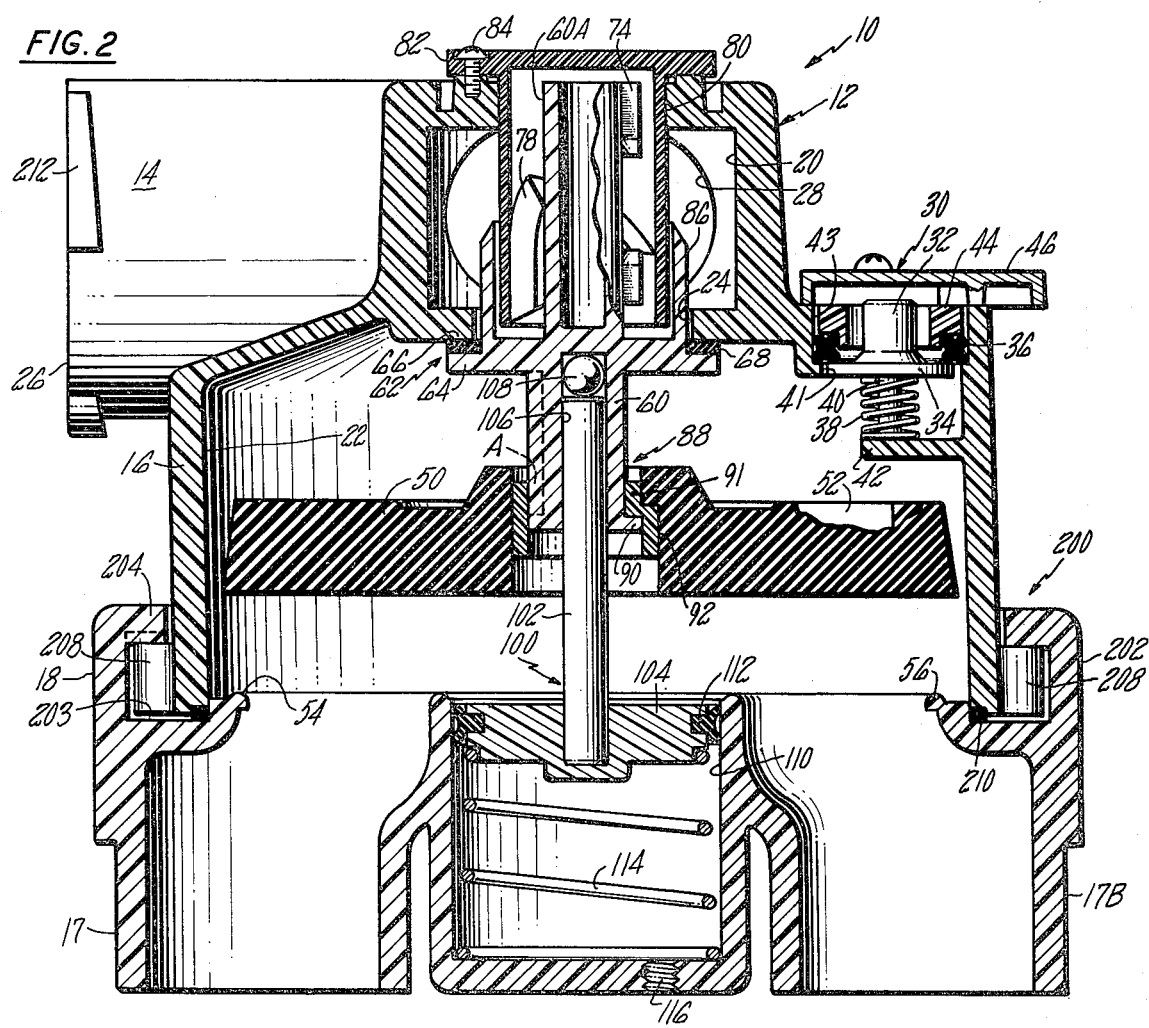
FIG. 2 is an enlarged cross-sectional view taken through the valve shown in FIG. 1.

The cam followers 74 and 76 are longitudinally spaced along and circumferentially offset on rod 60A, so that as rod 60A, and hence cam followers 74 and 76, commence their downward stroke from their FIG. 2 position, cam follower 74 will contact a cooperating upper face of a cam mechanism 78 causing cam follower 74 to rotate as it translates, or reciprocates, therefore also causing rod 60 and valving member 50 to rotate— this action placing the port 52 in alignment with one of the outlet ports of the outlet section 18 so that water can flow through port 52 and its aligned outlet port. As the cam followers 74 and 76 return to their FIG. 2 position, cam follower 76 will then engage a cooperating lower face of a cam mechanism 78 causing cam follower 76 to rotate as it translates, or reciprocates, upwardly therefore also causing rod 60 and valving member 50 to rotate, so that the port 52 will be rotated towards its next outlet port to be engaged when the mechanism is again moved downwardly. Other camming arrangements can be used, and one is shown in U.S. Pat. Nos. 3,460,560; 3,524,470; and 3,924,652, to obtain step-by-step sequencing with reciprocation.

The piston arrangement 62 has its piston basically formed as a cylinder 86 which extends upwardly from the circular flange 64 between the outer surface of the indexing cylinder 80 and the inner surface of the cylindrical opening 24 into the first chamber 20. It is to be noted that the opening 24 could be extended in length with a valve seat therein (such as shown in U.S. application Ser. No. 710,792) now U.S. Pat. No. 4,125,124 with the circular flange 64 fitting within the extended opening 24 and having an annular sealing member for engaging the valve seat.

The lower end of rod 60 is connected to distributing valve member 50 through a slide connecting joint 88 wherein limited axial sliding movement is permitted by the rod 60 and distributing valve member 50 and relative rotation between rod 60 and valving member 50 is prevented. The slide connecting joint 88 includes a sleeve member fixed in the valving member 50, said sleeve member includes an upper sleeve 91 and a larger lower sleeve 92. A flange member 90 projects outwardly from the bottom end of the rod 60 to have slidable movement within the larger sleeve 92 and the rod 60 is keyed in the sleeve 91 at A. It can be seen that the flange member 90 limits the downward movement of distributing valving member 50 with relation to the rod 60 since it will engage the annular abutment formed by the upper and lower sleeves 91 and 92. This connection also provides a positive unseating force for valve member 50 when said rod 60 is moved upwardly. The connecting means between the rod 60 and the distributing valve member 50 is the same as shown in U.S. application Ser. No. 710,792 now U.S. Pat. No. 4,125,124, referred to above.

The piston arrangement 62, rod extension 60A, rod 60, and valving member 50 are biased to their position shown in FIG. 2 by a biasing mechanism 100. This mechanism comprises a rod 102 having a piston 104 fixed to the lower end thereof. The rod 102 is placed in a mating bore 106 located up the center of rod 60. The mating bore 106 is shown extending to approximately the location of the flange 64. A ball 108 is located between the end of the rod 102 and the bottom of the mating bore 106. Piston 104 is located in a bore 110 in the outlet section 18 at the center of the outlet ports. A seal ring 112 is positioned around the outer circumference of piston 104 for engaging the side of the bore 110 to prevent any leakage of fluid thereby. A spring 114 is positioned between the bottom of said bore 110 and the facing bottom of said piston 104. Opening 116 opens the bottom of the bore to atmosphere so that a fluid will not become trapped therein and prevent the free movement of piston 104 when it is operating in this mode.

It can be seen that as water under pressure enters inlet 26 and passes from inlet section 14 to the first chamber 20 of the intermediate section 16, the water will act on the piston valve arrangement 62 moving it downwardly when the force can overcome the force provided by the spring 114. At that point, the cam follower 74 moves downwardly to engage the cooperating face of cam 78 and the port 52 is aligned with the next outlet port and the water is permitted to flow past the upper end of the cylinder 86. It is noted that the length of the cylinder 86 is made so that as the valve member 50 has its lower surface engage the outlet ports, the upper end of the cylinder 86 will be positioned to permit water flow through the cylindrical opening 24 into the chamber 22 where it can flow out the port 52. When the water under pressure is turned off at inlet 26, the force provided by the spring 114 will act on the piston valve arrangement 62 to move it upwardly and place the sealing member 68 against the annular surface 66 closing the opening 24. At the same time, the cam follower 76 moves upwardly to engage the cooperating face of cam 78 and the port 52 is rotated towards the next outlet port to be engaged when the mechanism is again moved downwardly when water under sufficient pressure enters inlet 26.

Figure 4:
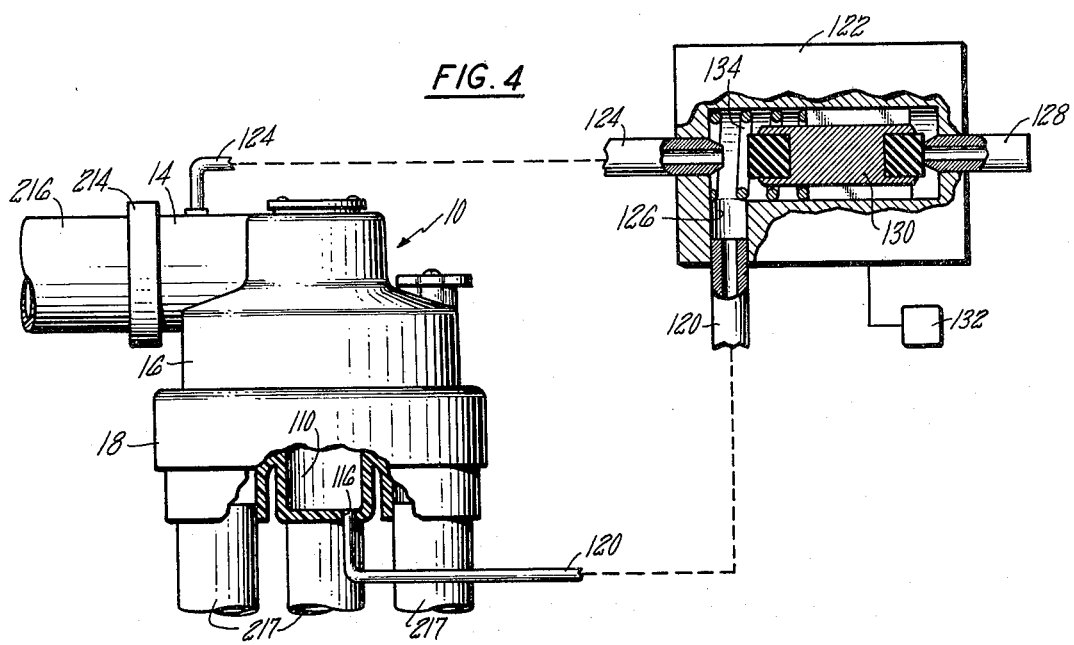
FIG. 4 is a view showing the sequencing valve with external tubing arranged so that a positive pressure is directed to the sequencing valve for preventing flow therethrough.

A modification is shown in FIG. 4 wherein a tube 120 has one end fixedly positioned in opening 116, while the other end is connected to a solenoid valve 122. The inlet section 14 is connected by a tube 124 to the solenoid valve 122. These tubes 120 and 124 enter into a chamber 126. The solenoid valve 122 also has a short tube section 128 which is directed to atmosphere for dumping. The solenoid valve 122 has a plunger 130 which is biased by a spring 134 into a position closing the end of the short tube section 128 within the solenoid valve. This connects the ends of tubes 124 and 120 by chamber 126 within the solenoid valve. When the solenoid valve is energized by switch 132, the plunger 130 is moved against the biasing means, spring 134, and closes the end of tube 124 in chamber 126 connecting the ends of tube 120 and end of tube section 128 in the solenoid valve, permitting fluid in tube 120 to dump.

It can be seen that when the solenoid valve is in its de-energized position, with the ends of tubes 124 and 120 connected, the pressure of fluid in inlet section 14 is placed in first chamber 20 and within bore 110 below piston 104. Since the effective pressure area of piston 104 is greater than the effective area of piston arrangement 62, the annular sealing member 68 will be held against annular surface 66 placing and holding the piston valve arrangement 62 in a closed position. If a spring 114 is used, this will provide an additional closing force. If spring 114 is left out of bore 110, then when pressure is removed from bore 110, only a minimum pressure is required to push the piston valve arrangement 62 downwardly to properly sequence the distributing valving member 50.

While FIG. 4 shows tube 124 connected to inlet section 14, it can also be connected to other known pressure sources so that with a fluid under pressure in inlet section 14, the solenoid valve 122 can provide for sequencing of the valve by placing it between an energized position and de-energized position by switch 132. The relative effective sizes of the piston valve arrangement 62 and piston 104 will have to be coordinated with the operating pressure admitted to bore 110 for exact known control.

Figure 5:
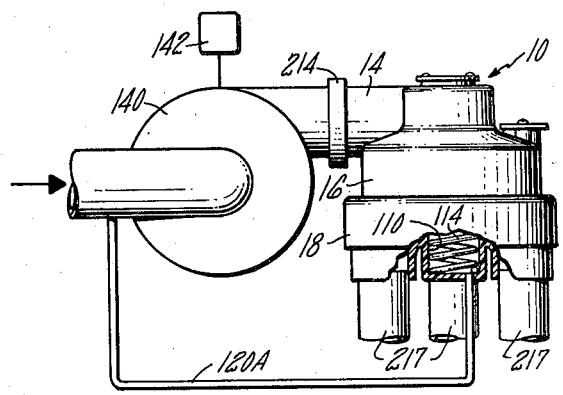
FIG. 5 is a view showing the sequencing valve with external tubing arranged so that a negative pressure is directed to the sequencing valve for movement of the valve to an open position.

Another modification is shown in FIG. 5 wherein a tube 120A has one end fixedly positioned in opening 116, while the other end is connected to the inlet of a pump 140 with the outlet of the pump being connected to inlet section 14. A switch 142 is provided to turn pump 140 on and off. It can be seen that with this modification, instead of sequencing valve 10 responding only to pump outlet flow which can be erratic during pump self-priming, piston 104 would be held down by the inlet suction of pump 140 which is much steadier, thus providing a valve for pump-fed systems that is dependably indexed from outlet to outlet.

While FIG. 5 shows tube 120A connected to the inlet of a pump 140, with the pump inlet providing a suction, the tube 120A can be connected to other suction sources, so that a separate operating valve could connect a suction source to bore 110 below piston 104 whenever it is desired.

Figure 3:
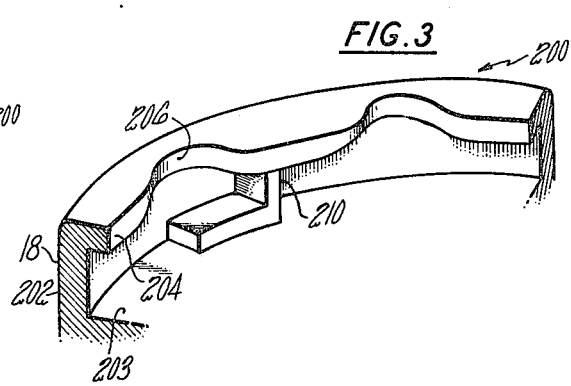
FIG. 3 is an enlarged view of one portion of the outlet section showing the connecting means to the bottom of the intermediate section of the housing.
Figure 6:
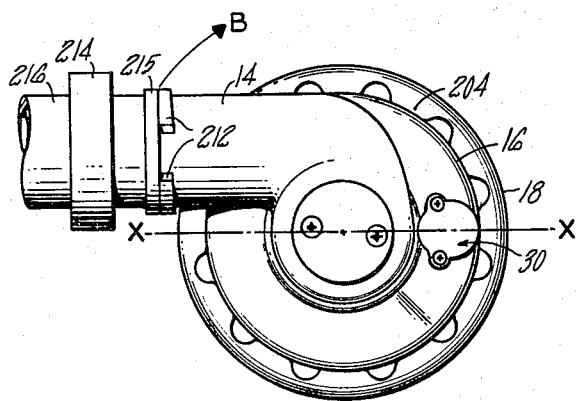
FIG. 6 is a top view showing the positioning of the inlet section of the sequencing valve with reference to a supply pipe.

As stated hereinbefore, the outlet section 18 is connected to the bottom of the intermediate section 16 at the open end of cylindrical chamber 22 by a quick connect-disconnect mechanism 200. The top of the outlet section 18 is formed having a cylindrical portion 202 with a lower inwardly extending annular surface 203 and an upper inwardly extending annular flange 204. The upper annular flange 204 has a plurality of equally spaced indentations 206 around its inner periphery. These indentations are substantially arcuate in shape to receive an equal number of projections 208 which extend outwardly around the lower part of the intermediate section 16. These projections 208 are arcuate shaped so that they will fit downwardly into the arcuate indentations 206. The indentations 206 and projections 208 are of the same number and arranged so that the intermediate section 16 can be positioned over the outlet section 18 with the projections 208 axially aligned with the indentations 206 so that as the intermediate section 16 and outlet section 18 are brought together, the projections 208 will pass through their mating indentations 206 and the bottom of the intermediate section 16 will engage the annular surface 203. At this point the intermediate section 16 is rotated to the left as shown in FIG. 6, moving the projections 208 under the annular flange 204 between adjacent indentations 206. The thickness of the annular flange 204 between adjacent indentations 206 in a closing direction, to the left, or counter-clockwise as shown in FIG. 3, is tapered so that the projections 208 are squeezed between the facing surfaces of the annular flange 204 and lower annular surface 203. This seals the mating ends of the intermediate section 16 and outlet section 18 (see "O" ring 210 in FIG. 2). To prevent the projections 208 from being turned with such a force so as to move them through to the next adjacent spaced indentation, a stop 210 is provided on the inner surface of the cylindrical portion 202. While an angular member fixed in place has been shown, other stop means can be used.

The free end of the inlet section 14 has three lugs 212 extending therefrom for engagement by a mating coupling 214 on a fluid delivery pipe 216. The coupling is of a conventional type having an inwardly extending flange means for engaging an outwardly extending flange means 215, wherein three inwardly extending lugs thereon pass through the spaces between lugs 212 and when the coupling member 214 is rotated clockwise, as shown in FIG. 6, the lugs become frictionally locked together, and the mating faces of the end of inlet section 14 and fluid delivery pipe 216 sealed, in view of the taper therebetween (see FIG. 1).

In an installation of a squeezing valve 10 having this type of quick connect-disconnect mechanism 200, the outlet pipes 217 which engage the operating outlets of a squeezing valve 10, such as 17, 17A, 17B and 17C, are fixed in place in the respective outlets of the sequencing valve 10 fixing the position of the outlet section 18. With the outlet section 18 in a fixed position, the intermediate section 16 with its integral section 14 is positioned with its projections 208 located in an operating position squeezed between the facing surfaces of the annular flange 204 and lower surface 203 (FIG. 2). As seen in FIG. 6, the inlet section 14 is constructed so that the mating face of the inlet 26 is positioned on one side of, and at least 90° to, a line X—X passing through the center of the sequencing valve 10. At this point a fluid delivery pipe 216 is fixedly mounted with its mating face against the mating face of the inlet section 14. In this position the coupling member 214 can fix the fluid delivery pipe 216 and inlet section 14 together. However, it can be seen that with the mating coupling member 214 removed, disconnecting the inlet section 14, the intermediate section 16 can be rotated clockwise, as shown by arrow B in FIG. 6, without interference, facilitating the removal of the intermediate section 16 from the outlet section 18, providing access for inspection or repair. It is noted that this arrangement is such that when the intermediate section 16 is rotated counter-clockwise into its sealing position with outlet section 18, the mating faces of the end of inlet section 14 and fluid delivery pipe 216 are together and ready for connection by coupling member 214.

I claim:

1. A sequencing valve comprising a housing, said housing including an inlet port and an outlet section having a plurality of outlet ports, said housing having a first chamber connected to said outlet ports, said housing further defining an internal flow passage whereby fluid communication may be established between said inlet port and said first chamber, said internal flow passage having a cylindrical opening entering into said first chamber, a valving member located in said first chamber having at least one opening therethrough, said valving member being movable between a seated and unseated position, in the seated position one or more valving member openings each registers with one of said housing outlet ports while the remainder of the valving member blocks flow through the remaining outlet ports, in the unseated position the valving member is spaced from said outlet ports, valve means located in said housing for cooperation with said cylindrical opening in said internal flow passage, said valve means being movable between a position where it coacts with said internal flow passage to prevent flow therethrough to a position allowing flow from said cylindrical opening of said internal passage into said first chamber, stem means connecting said valve means to said valving member, biasing means for biasing said valve means into a position coacting with said opening in said internal passage to prevent flow therethrough until sufficient force has been generated on said valve means to overcome said biasing means and for biasing said valving member into its unseated position, said housing having a circular sealing surface for said valve means to sealably bear against when fully biased by said biasing means to prevent flow through said internal flow passage, said valve means being movable to its position in said first chamber allowing flow in response to a sufficient force generated on said valve means, said movement of said valve means permitting said valving member to move to its seated position, cam means operatively connected to said housing and said stem means to cause said valving member to be rotatably indexed in response to movement of said valve means in one direction by a sufficient force and in the other direction by said biasing means so that said valving member opening or openings can be sequentially aligned with each of said outlet ports, said biasing means including means for controlling the force exerted by said biasing means.

2. A sequencing valve as set forth in claim 1 wherein said means for controlling the force exerted by said biasing means includes a fluid pressure device for applying a force on said valve means.

3. A sequencing valve as set forth in claim 2 wherein said fluid pressure device applies a force on said valve means to maintain said valve means in a closed position to prevent flow through said sequencing valve.

4. A sequencing valve as set forth in claim 1 wherein said means for controlling the force exerted by said biasing means includes a fluid pressure device for removing a closing force exerted on said valve means so a lesser sufficient force can move the valve means allowing flow therethrough.

5. A sequencing valve as set forth in claim 1 wherein said biasing means comprises a bore coaxially mounted in said housing below said valving member, a piston mounted in said bore, rod means extending upwardly from said piston, said rod means being operatively connected to said stem means, a fluid pressure device for directing fluid to said bore to bias said rod means against said stem means to position said valve means against said opening in said internal passage to maintain said valve means in a closed position to prevent flow therethrough.

6. A sequencing valve comprising a housing, said housing including an inlet port and an outlet section having a plurality of outlet ports, said housing having a first chamber connected to said outlet ports, said housing further defining an internal flow passage whereby fluid communication may be established between said inlet port and said first chamber, said internal flow passage having a cylindrical opening entering into said first chamber, a valving member located in said first chamber having at least one opening therethrough, said valving member being movable between a seated and unseated position, in the seated position one or more valving member openings each registers with one of said housing outlet ports while the remainder of the valving member blocks flow through the remaining outlet ports, in the unseated position the valving member is spaced from said outlet ports, valve means located in said housing for cooperation with said cylindrical opening in said internal flow passage, said valve means being cylindrical and coaxially mounted with said cylindrical opening, said valve means being movable between a position where it coacts with said internal flow passage to prevent flow therethrough to a position allowing flow from said cylindrical opening of said internal passage into said first chamber, stem means connecting said valve means to said valving member, said stem means and said valving member being coaxially mounted with said valve means, biasing means for biasing said valve means into a position coacting with said opening in said internal passage to prevent flow therethrough until sufficient force has been generated on said valve means to overcome said biasing means and for biasing said valving member into its unseated position, said housing having a circular sealing surface for said valve means to sealably bear against when fully biased by said biasing means to prevent flow through said internal flow passage, said valve means being movable to its position in said first chamber allowing flow in response to a sufficient force generated on said valve means, said movement of said valve means permitting said valving member to move to its seated position, cam means operatively connected to said housing and said stem means to cause said valving member to be rotatably indexed in response to movement of said valve means in one direction by a sufficient force and in the other direction by said biasing means so that said valving member opening or openings can be sequentially aligned with each of said outlet ports, said biasing means including means for controlling the force exerted by said biasing means, said means for controlling the force exerted by said biasing means including a bore located in said housing, said bore being coaxially positioned with said valve means, a piston means positioned for axial movement within said bore, means operatively connecting said piston means to said valve means for applying a force on said valve means.

7. A sequencing valve as set forth in claim 6 wherein a fluid pressure device is connected to said bore for applying a force on said piston means.

8. A sequencing valve as set forth in claim 6 wherein a fluid suction device is connected to said bore for applying a negative force on said piston means removing a closing force exerted on said valve means.

9. A sequencing valve as set forth in claim 6 wherein a fluid under pressure is directed to said inlet port and said fluid under pressure is also directed to said bore for applying a force on said piston means, means connecting said bore to drain when it is desired to have the fluid under pressure directed to said inlet port actuate said valve means to index the valving member to direct the fluid to the desired outlet port or ports.

10. A sequencing valve as set forth in claim 6 including a pump having an inlet and an outlet, first conduit means connecting said pump outlet to said inlet port and second conduit means connecting said pump inlet to said bore, means for turning said pump on and off so that when said pump is turned on, pump outlet pressure is delivered to said inlet port and a suction is placed in said bore from said pump inlet.

11. A sequencing valve comprising a housing, said housing including an inlet port and an outlet section having a plurality of outlet ports, said housing having a chamber connected to said outlet ports, a valving member located in said chamber having at least one opening therethrough, said valving member being movable between a seated and unseated position, means for directing a fluid into said inlet port putting a seating force on said valving member for placing it in its seated position, in the seated position one or more valving member openings each registers with one of said housing outlet ports while the remainder of the valving member blocks flow through the remaining outlet ports, in the unseated position the valving member is spaced from said outlet ports, stem means extending from said valving member, biasing means for biasing said valving member into its unseated position with an unseating force, cam means operatively connected to said housing and said stem means to cause said valving member to be rotatably indexed in one direction in response to movement of said valving member between its seated and unseated positions so that said valving member opening or openings can be sequentially aligned with each of said outlet ports, said biasing means including means for controlling the force unseating exerted by said biasing means, said controlling means being operable to reduce the unseating force biasing said valving member into its unseated position substantially simultaneously as said seating force is placed on said valving member from said inlet port to aid the seating force in moving the valving member to its seated position to connect said inlet port with an outlet port.

12. A sequencing valve comprising a housing, said housing including an inlet port and an outlet section having a plurality of outlet ports, said housing having a chamber connected to said outlet ports, a valving member located in said chamber having at least one opening therethrough, said valving member being movable between a seated and unseated position, in the seated position one or more valving member openings each registers with one of said housing outlet ports while the remainder of the valving member blocks flow through the remaining outlet ports, in the unseated position the valving member is spaced from said outlet ports, stem means extending from said valving member, biasing means for biasing said valving member into its unseated position, cam means operatively connected to said housing and said stem means to cause said valving member to be rotatably indexed in one direction in response to movement of said valving member between its seated and unseated positions so that said valving member opening or openings can be sequentially aligned with each of said outlet ports, said biasing means including means for controlling the force exerted by said biasing means, said controlling means being operable to vary the force biasing said valving member into its unseated position so a lesser force can move the valving member to its seated position to connect said inlet port with an outlet port, wherein said means for controlling the force exerted by said biasing means includes a bore located in said housing, a piston means positioned for axial movement within said bore, means operatively connecting said piston means to said valving member for applying a force on said valving member, a pump having an inlet and outlet, first conduit means connecting said pump outlet to said inlet port, second conduit means connecting said pump inlet to said bore, means for turning said pump on so that when said pump is turned on pump outlet pressure is delivered to said inlet port and a suction is placed in said bore from said pump inlet.

13. A sequencing valve comprising a housing, said housing including an inlet port and an outlet section having a plurality of outlet ports, said housing having a chamber connected to said outlet ports, a valving member located in said chamber having at least one opening therethrough, said valving member being movable between a seated and unseated position, means for directing a fluid into said inlet port putting a seating force on said valving member for placing it in its seated position, in the seated position one or more valving member openings each registers with one of said housing outlet ports while the remainder of the valving member blocks flow through the remaining outlet ports, in the unseated position the valving member is spaced from said outlet ports, stem means extending from said valving member, biasing means for biasing said valving member into its unseated position with an unseating force, cam means operatively connected to said housing and said stem means to cause said valving member to be rotatably indexed in one direction in response to movement of said valving member between its seated and unseated positions so that said valving member opening or openings can be sequentially aligned with each of said outlet ports, said biasing means including means for controlling the force exerted by said biasing means, said controlling means being operable to vary the force biasing said valving member into its unseated position so a lesser force can move the valving member to its seated position to connect said inlet port with an outlet port, wherein said biasing means comprises a first bore coaxially mounted in said housing below said valving member, a piston mounted in said bore, rod means extending upwardly from said piston, said stem means having a second bore located therein facing said first bore, said rod means extending into said second bore, the spring in said first bore biasing said piston and rod means toward said stem means, said rod means engaging a bottoming means of said second bore placing the valving member in an unseated position, means for placing a suction in said first bore substantially simultaneously as said seating force is placed on said valving member from said inlet port to aid the seating force in moving the valving member to its seated position.

14. A sequencing valve comprising a housing, said housing including an inlet port and an outlet section having a plurality of outlet ports, said housing having a chamber connected to said outlet ports, a valving member located in said chamber having at least one opening therethrough, said valving member being movable between a seated and unseated position, in the seated position one or more valving member openings each registers with one of said housing outlet ports while the remainder of the valving member blocks flow through the remaining outlet ports, in the unseated position the valving member is spaced from said outlet ports, stem means extending from said valving member, biasing means for biasing said valving member into its unseated position, cam means operatively connected to said housing and said stem means to cause said valving member to be rotatably indexed in one direction in response to movement of said valving member between its seated and unseated positions so that said valving member opening or openings can be sequentially aligned with each of said outlet ports, said biasing means including means for controlling the force exerted by said biasing means, said controlling means being operable to vary the force biasing said valving member into its unseated position so a lesser force can move the valving member to its seated position to connect said inlet port with an outlet port, wherein said biasing means comprises a bore coaxially mounted in said housing below said valving member, a piston mounted in said bore, means operatively connecting said piston to said stem means, fluid pressure means having an outlet, first conduit means connecting said fluid pressure means outlet to said inlet port, means for providing a suction, second conduit means connecting said means for providing a suction to said bore, means for turning said fluid pressure means on to deliver fluid pressure means outlet pressure to said inlet port, and means for turning on said means for providing suction so that a suction is placed in said bore, said means for providing suction being actuated substantially simultaneously as said means for turning said fluid pressure means on is actuated.

* * * * *

UNITED STATES PATENT AND TRADEMARK OFFICE
CERTIFICATE OF CORRECTION

PATENT NO. : 4,316,480
DATED : February 23, 1982
INVENTOR(S) : Carl L. C. Kah, Jr.

It is certified that error appears in the above—identified patent and that said Letters Patent are hereby corrected as shown below:

Column 9, line 29, "force unseating" should be -- unseating force --

Signed and Sealed this

Twenty-fifth Day of May 1982

[SEAL]

Attest:

Attesting Officer

GERALD J. MOSSINGHOFF
Commissioner of Patents and Trademarks